(12) United States Patent
Westerhoff et al.

(10) Patent No.: US 11,774,341 B2
(45) Date of Patent: Oct. 3, 2023

(54) QUANTIFICATION OF NANOBUBBLE REACTIVITY IN WATER

(71) Applicants: Paul K. Westerhoff, Scottsdale, AZ (US); Shahnawaz Sinha, Chandler, AZ (US); Yuqiang Bi, Chandler, AZ (US)

(72) Inventors: Paul K. Westerhoff, Scottsdale, AZ (US); Shahnawaz Sinha, Chandler, AZ (US); Yuqiang Bi, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 129 days.

(21) Appl. No.: 17/447,259

(22) Filed: Sep. 9, 2021

(65) Prior Publication Data
US 2022/0074841 A1    Mar. 10, 2022

Related U.S. Application Data

(60) Provisional application No. 63/075,969, filed on Sep. 9, 2020.

(51) Int. Cl.
*G01N 15/06* (2006.01)
*G01N 31/22* (2006.01)
*G01N 15/00* (2006.01)

(52) U.S. Cl.
CPC .......... *G01N 15/06* (2013.01); *G01N 31/22* (2013.01); *G01N 2015/0011* (2013.01); *G01N 2015/0681* (2013.01); *G01N 2015/0693* (2013.01)

(58) Field of Classification Search
CPC .............. G01N 15/06; G01N 31/22; G01N 2015/0011; G01N 2015/0681; G01N 2015/0693; G01N 31/225
See application file for complete search history.

(56) References Cited

U.S. PATENT DOCUMENTS

2018/0252702 A1*  9/2018  Irudayaraj .............. A61K 47/54

OTHER PUBLICATIONS

Azevedo et al. "Aqueous Dispersions of Nanobubbles: Generation, Properties and Features." Minerals Engineering, vol. 94, May 13, 2016, pp. 29-37., https://doi.org/10.1016/j.mineng.2016.05.001. (Year: 2016).*
Joni, I Made, et al. "Degradation of Methylene Blue Using Bubbles Treatment." AIP Conference Proceedings, May 5, 2020, https://doi.org/10.1063/5.0003081 (Year: 2020).*
Ahmed et al., "Influences of Air, Oxygen, Nitrogen, and Carbon Dioxide Nanobubbles on Seed Germination and Plant Growth," J. Agric. Food Chem., 2018, 66:5117-5124.
Liu et al., "Identification of ROS Produced by Nanobubbles and Their Positive and Negative Effects on Vegetable Seed Germination," Langmuir, 2016, 32:11295-11302.
Liu et al., "Oxidative Capacity of Nanobubbles and Its Effect on Seed Germination," ACS Sustainable Chem. Eng., 2016, 4:1347-1353.
Liu et al., "Reactive oxygen species induced by water containing nano-bubbles and its role in the improvement of barley seed germination," 4th Micro and Nano Flows Conference, UCL, London, UK, Sep. 7-10, 2014, 8 pages.
Takahashi et al., "Free-Radical Generation from Collapsing Microbubbles in the Absence of a Dynamic Stimulus," J. Phys. Chem. B, 2007, 111:1343-1347.

* cited by examiner

*Primary Examiner* — Jennifer Wecker
*Assistant Examiner* — Ali Husain Faraz
(74) *Attorney, Agent, or Firm* — Fish & Richardson P.C.

(57) ABSTRACT

Quantifying nanobubbles in solution includes combining an indicator with a fluid comprising nanobubbles to yield a first solution, bursting the nanobubbles in the first solution to yield a second solution, and assessing a difference between the first solution and the second solution to yield a concentration of the nanobubbles in the first solution, a concentration of reactive oxygen species in the first solution or the second solution, or both.

17 Claims, No Drawings

QUANTIFICATION OF NANOBUBBLE REACTIVITY IN WATER

CROSS-REFERENCE TO RELATED APPLICATION

This application claims the benefit of U.S. Patent Application No. 63/075,969 filed on Sep. 9, 2020, which is incorporated herein by reference in its entirety.

STATEMENT OF GOVERNMENT SUPPORT

This invention was made with government support under 1449500 awarded by the National Science Foundation. The government has certain rights in the invention.

TECHNICAL FIELD

This invention relates to methods and systems for quantifying the reactivity of nanobubbles in water.

BACKGROUND

Nanobubbles are an emerging water treatment technology that can be applied in lakes, ponds, rivers, groundwater, treatment plants, pipelines, medical facilities, industrial cooling towers, and many other industrial applications. Nanobubbles can be generated through a variety of methods. Nanobubble chemistry has been explored for applications such as horticulture, agriculture, hydroponics, aquaponics, mining, and treatment of potable water, industrial water, and wastewater. Current detection of nanobubbles in water involves counting the number of nanobubbles using various laser or other light scattering technologies. However, this method is more generally suited for high purity water due to interference from other particles in field samples.

SUMMARY

This disclosure relates to methods and systems for quantification of nanobubble reactivity in water. Nanobubble presence in water and its relative concentrations (nanobubbles/mL) are assessed by a spectrophotometric (colorimetric) method in which nanobubbles are burst in the presence of a colored dye that reacts with reactive oxygen species (ROS) associated with nanobubbles. The change in dye concentration correlates with the presence and reactivity of the nanobubbles.

In a general aspect, quantifying nanobubbles in solution includes combining an indicator with a fluid comprising nanobubbles to yield a first solution, bursting the nanobubbles in the first solution to yield a second solution, and assessing a difference between the first solution and the second solution to yield a concentration of the nanobubbles in the first solution, a concentration of reactive oxygen species in the first solution or the second solution, or both.

Implementations of the general aspect may include one or more of the following features.

The nanobubbles can have an average diameter in a range of about 20 nm to about 1000 nm (e.g., about 20 nm to about 500 nm). The fluid can be an aqueous fluid (e.g., water). The indicator can be a dye (e.g., methylene blue). The reactive oxygen species can include a free radical (e.g., a hydroxyl radical).

A concentration of nanobubbles in the first solution is typically in a range between $10^6$ and $10^9$ nanobubbles/mL of the first solution. Bursting the nanobubbles can be achieved by sonicating the first solution. Bursting the nanobubbles releases the reactive oxygen species. The reactive oxygen species oxidizes the indicator.

Assessing the difference between the first solution and the second solution can include assessing a difference in concentration of the indicator between the first solution and the second solution or between a control solution and the second solution. In some cases, assessing the difference between the first solution and the second solution comprises a spectrophotometric assessment of the second solution. The spectrophotometric assessment of the second solution can include measuring absorption of the second solution at a specified wavelength of radiation (e.g., at 663 nm).

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Nanobubbles range in size (e.g., diameter) from 20 nm up to 1000 nm (e.g., up to 500 nm), and can include bubbles of water in gas (e.g., air) or gas bubbles in water. The concentration of nanobubbles can vary from $10^6$ to $10^9$ nanobubbles/mL. The presence of large quantities of nanobubbles in water can alter the bulk water and/or contaminant chemistries (e.g., solubility, surface charge, zeta potential, etc.) by oxidizing contaminants in water due to the formation of free radicals.

Nanobubbles can be generated through methods including, ejector, venturi, cavitation, and mixing processes. During nanobubble generation, the water becomes milky (white). When nanobubble generation ceases, the milky appearance gradually vanishes within 5-10 minutes and then fades away, with the water becoming clearer. First, larger microbubbles collapse and then vanish. However, some nanobubbles remain in the water and are relatively stable. During this stage, it may be difficult to detect nanobubbles in water (colorless), and if present, the concentration level. Nanobubbles can exist in pure, clear water for several days (dependent on the pH and temperature of water).

As described herein, nanobubble density is assessed by generating reactive oxygen species (ROS) in solution by bursting nanobubbles (e.g., by sonication), and subsequently reacting the ROS with a dye the solution, thereby depleting its color. Initially, nanobubble-containing water is colored with a dye (e.g., methylene blue) as a blank/initial sample. Then nanobubbles are intentionally "popped" to produce ROS. For example, an ultrasonic probe (i.e., sonicator as a stimulus) can collapse and abruptly burst nanobubbles to generate ROS. Generation of ROS will then oxidize the methylene blue (dye) solution in water, resulting in a reduced methylene blue coloration, which can be measured by a spectrophotometer (e.g., at 663 nm). The color depletion of methylene blue is then related back to the concentration of nanobubbles in water. Thus, a higher reduction of dye (concentration) is an indicative a higher number or concentration of nanobubbles (and hence ROS) in water. As such, a dye (e.g., methylene blue) can be used to confirm the presence of nanobubbles and their concentration in water by relating ROS (such as OH·) by induction of nanobubble collapse (e.g., via sonication).

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of quantifying nanobubbles in solution, the method comprising:
   combining an indicator with a fluid comprising nanobubbles to yield a first solution;
   bursting the nanobubbles in the first solution to yield a second solution; and
   assessing a difference between the first solution and the second solution to yield:
   a concentration of the nanobubbles in the first solution,
   a concentration of reactive oxygen species in the first solution or the second solution, or both,
   wherein the indicator comprises methylene blue, and the reactive oxygen species oxidizes the methylene blue, thus producing a colon metric reaction between the methylene and the reactive oxygen species, and
   wherein the colorimetric reaction produces color depletion of methylene blue, which is related back to the concentration of nanobubbles in the second solution.

2. The method of claim 1, wherein the nanobubbles have an average diameter in a range of about 20 nm to about 1000 nm.

3. The method of claim 2, wherein the nanobubbles have an average diameter in a range of about 20 nm to about 500 nm.

4. The method of claim 1, wherein the fluid is an aqueous fluid.

5. The method of claim 4, wherein the fluid is water.

6. The method of claim 1, wherein bursting the nanobubbles comprises sonicating the first solution.

7. The method of claim 1, wherein assessing the difference between the first solution and the second solution comprises assessing a difference in concentration of the indicator between the first solution and the second solution.

8. The method of claim 1, wherein assessing the difference between the first solution and the second solution comprises assessing a difference in concentration of the indicator between a control solution and the second solution.

9. The method of claim 1, wherein assessing the difference between the first solution and the second solution comprises assessing a difference in color between the first solution and the second solution.

10. The method of claim 1, wherein assessing the difference between the first solution and the second solution comprises assessing a difference in color between a control solution and the second solution.

11. The method of claim 1, wherein the reactive oxygen species comprises a free radical.

12. The method of claim 11, wherein the reactive oxygen species comprises a hydroxyl radical.

13. The method of claim 1, wherein a concentration of nanobubbles in the first solution is in a range between $10^6$ and $10^9$ nanobubbles/mL of the first solution.

14. The method of claim 1, wherein bursting the nanobubbles releases the reactive oxygen species.

15. The method of claim 1, wherein assessing the difference between the first solution and the second solution comprises a spectrophotometric assessment of the second solution.

16. The method of claim 15, wherein the spectrophotometric assessment of the second solution comprises measuring absorption of the second solution at a specified wavelength of radiation.

17. The method of claim 15, wherein the spectrophotometric assessment of the second solution comprises measuring absorption of the second solution at 663 nm.

* * * * *